2,830,421
MULTIPLE LAWN MOWER HARNESS

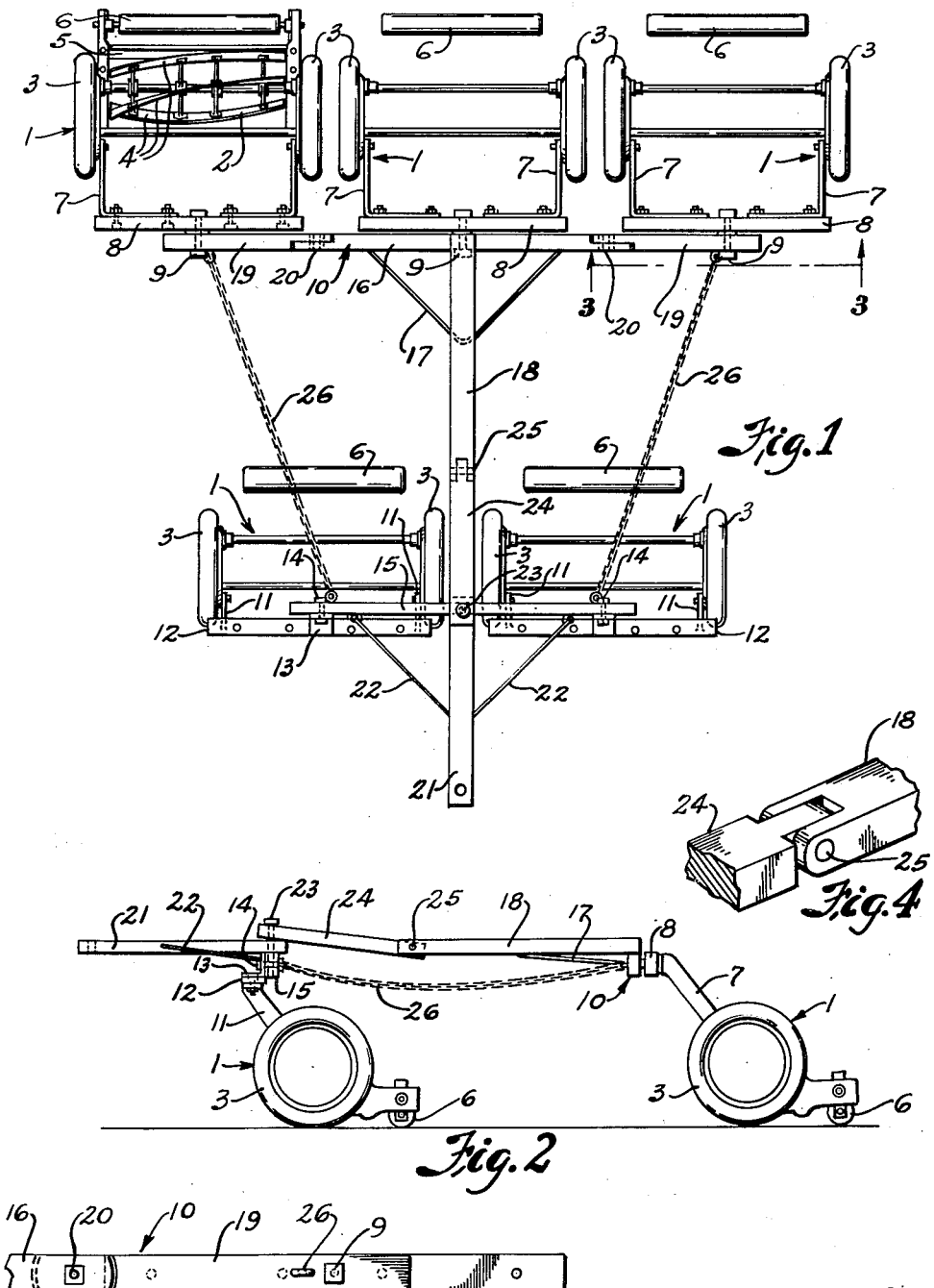

Walter J. Blue, Stanley F. Blue, and John M. Belich, Cleveland, Ohio

Application March 16, 1955, Serial No. 494,616

4 Claims. (Cl. 56—7)

The present invention relates generally as indicated to a multiple lawn mover harness of the type which is adapted to be towed as by means of a tractor.

It is a principal object of this invention to provide a multiple lawn mower harness wherein each of the lawn mowers mounted thereon is pivotally mounted to the harness about a horizontally disposed axis located in a plane parallel to the planes of the wheels and midway therebetween, whereby uneven, non-uniformly sloping terrain may be efficiently mowed when the harness is towed behind a tractor.

It is another object of this invention to provide a multiple lawn mower harness wherein the front and rear gangs of staggered lawn mowers are pivotally mounted with respect to each other about a horizontally disposed axis parallel to the longitudinal axes of the gangs of mowers, whereby to enable uniform mowing of grass at the bottoms or tops of hills as the front gang starts to move uphill or downhill while the rear gang is yet on generally level ground.

It is another object of this invention to provide a lawn mover harness in which the front gang of lawn mowers is pivotally connected to the harness about a vertical axis, whereby the front mowers are turnable as a unit to facilitate turning of corners and mowing of lawns which require the tractor to travel in a curved or zigzag path.

It is another object of this invention to provide a lawn mower harness wherein the lawn mowers constituting the rear gang are not only pivotally mounted as aforesaid about horizontal axes passing midway between the wheels thereof, but, in addition, the outer ones of said rear gang mowers are pivotally mounted about other horizontally disposed axes located between the first-mentioned axes, whereby said outer mowers may pass over bumps in the terrain or may mow areas at higher or lower elevations than areas being mowed by the intermediate or inner mower or mowers.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of a few of the various ways in which the principle of the invention may be employed.

In said annexed drawings:

Fig. 1 is a top plan view of a preferred embodiment of this invention;

Fig. 2 is a side elevation view as viewed from the right-hand side of Fig. 1;

Fig. 3 is a fragmentary elevation view as viewed substantially along the line 3—3, Fig. 1; and Fig. 4 is a fragmentary perspective view showing the horizontal pivotal connection between the front and rear gangs of the harness.

Referring now more particularly to the drawing, the lawn mowers 1 herein are each of the conventional reel type provided with a revolving reel 2 which is driven by wheels 3 and which has blades 4 cooperating in well known manner with a bed knife 5, and further provided with an adjustable ground-engaging roller 6 which, together with the wheels 3, serves to support the bed knife 5 at a desired height from the ground.

However, instead of the customary lawn mower handle, the handle brackets 7 of each of the rear gang of lawn mowers 1 have been shifted, as best shown in Fig. 2, and locked thereat so that the ground-engaging rollers 6 cannot swing upwardly in a counterclockwise direction as the wheels 3 rotate in a counterclockwise direction. The upper ends of each pair of said handle brackets 7 are secured as by bolts to a bar 8, which bar in turn is pivotally and detachably connected by means of the bolt 9 to the rear cross bar assembly 10 of the harness.

As best shown in Fig. 1, each of the rear gang of lawn mowers is mounted for pulling by the harness, and each is capable of pivotal movement about its respective pivot bolt 9 with respect to the others, and in this way the rear gang of mowers may partake of relative pivotal movement over rough or uneven terrain. In this case, the rear gang comprises three successive lawn mowers 1, where as the front gang comprises two such lawn mowers 1 which are staggered with respect to the rear gang of mowers, whereby a wide swath may be uniformly mowed during each pass of the harness and lawn mower gang assembly.

The lawn mowers 1 comprising the front gang have their handle brackets 11 bolted to bars 12, and each bar 12 has welded thereto an intermediate angle piece 13, the vertical flange of which is provided with an opening for a pivot bolt 14 by means of which said front lawn mowers 1 are pivotally connected adjacent the ends of a front cross bar 15. Here again, the front gang lawn mowers 1 may partake of relative pivotal movement about the horizontal axes of said bolts 14 to enable mowing of uneven terrain.

The rear cross bar assembly 10 comprises an intermediate part 16 which is welded to and braced as by braces 17, a rear stem part 18, the braces 17 being also welded or otherwise secured to such stem part. Said cross-bar assembly includes outer end parts 19 which are connected to part 16 at the pivots 20 and to which end parts the outer mowers 1 of the rear gang are pivotally secured as before described. As is evident, these horizontal pivots 20 on the rear cross bar assembly 10 provide for additional flexibility so that the outer mowers 1 may assume any necessary relative positions with respect to each other and with respect to the center mower 1 as required by the unevenness or changing of slope of the terrain being mowed.

The front cross bar 15 is securely fastened to a front stem part or tongue 21 as by welding, and in addition braces 22 are welded or otherwise secured to cross bar 15 and stem part 21, the front end of said stem part 21 being provided with an opening by means of which the harness may be detachably secured to the rearwardly extending draw bar of a tractor (not shown).

The front stem part 21 and front cross bar 8 are secured together to form a T as shown, which, at the center of the cross bar 8, is loosely, pivotally secured by means of the bolt 23 to the front end portion of an intermediate stem part 24, the latter being pivotally secured at its rear end to the front end of the rear stem part 18 about the horizontally and transversely disposed pin 25 whose axis is in between the front and rear gangs of lawn mowers 1.

By reason of the vertical pivot between the front gang assembly and the rear gang assembly about the bolt 23, the front gang assembly may be turned with respect to the rear gang assembly, whereby the harness and lawn mower assembly may conveniently turn corners or travel in a curved path, the extent of such turning being limited by the slack in the chains 26 which are connected at their opposite ends to the front cross bar 15 and to the rear cross bar assembly 10.

The provision of the horizontal pivot 25 transverse to the stem assembly 21, 24, 18 enables relative pivotal movement of the entire front gang assembly with respect to the entire rear gang assembly for uniform mowing of the crowns of hills as the tractor and front gang of mowers start to move downward from the top of a hill or start to move uphill from generally level ground.

As can now be seen, the present invention provides an extremely flexible assembly by means of which lawns on hilly, uneven terrain may be easily and efficiently mowed. Thus, "scalping" of the top crests of hilly terrain is eliminated; and, moreover, the grass in hollows defined at the junctions of level ground with hills or of hills of different slopes, is uniformly cut by using the present harness.

In essence, each lawn mower 1 herein is capable of tilting movement independently of the others, and, in addition, the front gang may turn about pivot 23 and may move up and down about pivot 25 with respect to the rear gang, and the outer mowers of the rear gang may move up and down about pivots 20 with respect to the intermediate mower of the rear gang.

Another distinctive feature of the present invention is the simple one-bolt mounting of each lawn mower to the harness whereby periodic removal thereof for adjustment and sharpening may be easily and quickly accomplished.

Other modes of applying the principle of the invention may be employed, change being made as regards the details described, provided the features stated in any of the following claims, or the equivalent of such, be employed.

We therefore particularly point out and distinctly claim as our invention:

1. In a multiple lawn mower harness, the combination of a longitudinally extending stem having front and rear cross bars secured thereto, and means for mounting a plurality of lawn mowers in trailing relation to each cross bar, said stem comprising adjacent sections to which the respective cross bars are secured and which sections are pivotally joined together at about the stem and front cross bar junction, for turning of said front cross bar about a vertical axis with respect to said rear cross bar as said harness is towed around corners.

2. In a multiple lawn mower harness, the combination of a longitudinally extending stem having front and rear cross bars secured thereto, and means for mounting a plurality of lawn mowers in trailing relation to each cross bar, said stem comprising a plurality of sections which are pivotally joined together to provide a vertical pivotal axis and horizontal pivotal axis, such axes being located for turning of said front cross bar and the stem section to which secured about such vertical axis at about their junction with respect to said rear cross bar and the stem section to which secured and for relative swinging of said cross bars and the respective stem sections about such horizontal axis rearward of said front cross bar as said harness is towed around corners and over hilly terrain respectively.

3. In a multiple lawn mower harness, the combination of a longitudinally extending stem having front and rear cross bars secured thereto, and means for pivotally mounting a plurality of lawn mowers in trailing relation to each cross bar about axes parallel to said stem with the mowers on said front cross bar staggered with respect to those on said rear cross bar, said stem and said front cross bar defining a cross, said stem comprising adjacent sections which are pivotally joined together about a vertical axis at the junction of said stem and said front cross bar to enable towing of said harness around corners.

4. In a multiple lawn mower harness, the combination of a longitudinally extending stem having front and rear cross bars secured thereto, and means for pivotally mounting a plurality of lawn mowers in trailing relation to each cross bar about axes parallel to said stem with the mowers on said front cross bar staggered with respect to those on said rear cross bar, said stem and said front cross bar defining a cross, said stem comprising adjacent sections which are pivotally joined together about a vertical axis at the junction of said stem and said front cross bar, to enable towing of such said harness around corners, said adjacent sections of said stem additionally be jointed between said cross bars about a horizontal axis for up and down relative swinging movement of said cross bars.

References Cited in the file of this patent

UNITED STATES PATENTS

| | | |
|---|---|---|
| 713,207 | Cotten | Nov. 11, 1902 |
| 1,712,722 | Worthington | May 14, 1929 |
| 1,878,346 | Swanson | Sept. 20, 1932 |
| 2,177,189 | Roseman | Oct. 24, 1939 |
| 2,699,957 | White | Jan. 18, 1955 |